United States Patent Office
3,479,288
Patented Nov. 18, 1969

3,479,288
COMPOSITION AND METHOD FOR WATER-PROOFING LEATHER AND FUR
Hans Markert and Rudi Heyden, Dusseldorf, Germany, assignors to Bohme Chemie Gesellschaft mit beschrankter Haftung, Dusseldorf, Germany, a corporation of Germany
No Drawing. Filed Aug. 18, 1965, Ser. No. 480,803
Claims priority, application Germany, Oct. 10, 1964, B 78,868
Int. Cl. C14c 9/00
U.S. Cl. 252—8.57                                                    6 Claims

ABSTRACT OF THE DISCLOSURE

Novel compositions comprised of 1 to 25% by weight of a partial amide or ester of citric acid having at least one free carboxyl and having in the amide or ester portion a saturated branched aliphatic radical of 12 to 20 carbon atoms in an organic solvent and the method of waterproofing furs and leather therewith and leather and fur skins resulting therefrom.

STATE OF THE ART

In copending, commonly-assigned application Ser. No. 95,830, filed on Mar. 15, 1961, now abandoned there is described a process for water-proofing leather and furs by treating them with solutions of polycarboxylic acid esters and amides which have at least one free carboxyl group and have at least one unsaturated high molecular weight aliphatic hydrocarbon radical of 8 to 22 carbon atoms in organic solvents. The leathers and furs treated by the said process have a very low water absorbability and a very low water permeability under dynamic test conditions and therefore are useful as leather subjected to heavy mechanical use such as bottom leather, shoe top leather and technical leather.

OBJECTS OF INVENTION

It is an object of the invention to provide a novel method for rendering leather and furs waterproof.

It another object of the invention to provide novel compositions for rendering leather and furs waterproof.

It is an additional object of the invention to provide novel waterproof leather and furs.

These and other objects and advantages of the invention will become obvious from the following detailed description.

THE INVENTION

The novel method of the invention for rendering leather and furs waterproof comprises impregnating said leather and furs with a solution of at least one citric acid derivative selected from the group consisting of partial esters and partial amides thereof having at least one free carboxyl group and having in the ester and amide moiety at least one saturated branched aliphatic hydrocarbon radical of 10 to 20 carbon atoms wherein 30 to 70% of the carbon atoms are in the side chains in organic solvents.

The impregnating activity of the said citric acid derivatives is unexpected since the corresponding citric acid derivatives with a saturated unbranched aliphatic hydrocarbon radical do not give any improvement in waterproofing over that of usual fat liquoring. Until now, satisfactory waterproofing of leather and furs could be obtained only with products having an unsaturated lipophilic radical as in application Ser. No. 95,830 now abandoned. The leather and furs of the present method have the advantages of having a very light color and exceptional light-stability as compared to the leather produced by the method of the said copending application because the products used are practically entirely colorless.

The products useful for the impregnation may be prepared by partially esterifying or partially amidifying citric acid with an alcohol or amine containing a branched aliphatic hydrocarbon radical of 12 to 20 carbon atoms, 30 to 70% of which are in side chains. Particularly preferred are the mono esters of citric acid and branched high molecular weight alcohols, preferably Guerbet alcohols, because their activity is superior to the other products. The branched alcohols may be prepared from branched olefinic hydrocarbons with the oxo synthesis or by the Guerbet reaction. With a low degree of chain branching such as in many Guerbet alcohols or from isobutylene in the oxo synthesis, the side chains should have at least 4 carbon atoms and with a high degree of chain branching such as tetrapropylene in the oxo synthesis, shorter side chains in greater number may be present. The corresponding amines can be prepared from the said alcohols by known procedures.

Examples of organic solvents in which the impregnating agents may be dissolved for employment in the present invention are trichloroethylene, percholoroethylene, gasoline, toluene, isopropanol and other lower alkanols, methylethyl ketone, cyclohexanone, butyl acetate, etc. The selection of the particular solvent will depend upon the solubility characteristics of the impregnating compound.

The compositions of the invention may be used alone or in combination with other compositions useful for waterproofing leather. The use of the present compositions with organic solution of cationic-active, complex salts formed by condensation of polyvalent metal alcoholates with acid high molecular weight esters of phosphoric acid as described in U.S. Patent No. 2,885,417 is particularly desirable. The impregnation with these agents may be performed simultaneously or in sequence.

Suitable alcoholates as described in Patent No. 2,885,417 are magnesium, titanium, zirconium or aluminum alcoholates wherein the alkyl radical has 1 to 12 carbon atoms, preferably lower alkyls. Examples of suitable alcoholates are aluminum isopropylate, aluminum butylate, aluminum octylate and aluminum dodecylate. Neutral alcoholates are usually used but basic alcoholates may also be used to form the complexes. Mixtures of various alcoholates may be used.

The acid esters of the phosphoric acids are the mono and diesters. The alcohol portion of the ester is derived from aromatic or aliphatic alcohols having more than six carbon atoms. The diesters may be used in admixture with the monoesters or esters whose alcohol radicals contain substituents or are interrupted by hetero atoms or groups containing hetero atoms. The acid portion of the ester may be phosphoric acid such as phosphoric alkylamides, alkylphosphoric acid or alkylphosphinic acid. Examples of suitable esters are phosphoric acid monooctyl ester, phosphoric acid mono-dodecyl ester, phosphoric acid mono-oleyl ester, phosphoric acid mono-alkylphenol ester wherein the alkyl has 3 to 18 carbon atoms, phosphoric acid mono-naphthenyl esters, phosphoric acid mono-abietyl ester, etc.

The complexes are usually formed in the presence of organic solvents such as isopropanol, toluene, aliphatic halogens or trichloroethylene wherein the ratio of metal alcoholate to phosphoric acid ester is 1:0.5 to 1.5 but other molar ratios may be used. In some instances the complex may be formed by using solutions of the starting material.

By dissolving the said complexes in the compositions of the present invention, a one step impregnation may be used. If necessary, complex stabilizers such as acetylacetone, acetylacetate, etc., may be added to the composition.

All types of leather and furs may be impregnated with the aid of the impregnating compositions of the invention. Particularly surprising was the fact that not only aluminum-tanned, chrome-tanned and chrome-combination-tanned leathers can be made water-resistant therewith, but also that synthetically or vegetable-tanned leather can be made water-repellent. This could not have been foreseen because synthetically or vegetable-tanned leathers do not, as a rule, comprise any groups which could combine with the said derivatives. Also a considerably improved impregnation effect can be achieved with mineral-tanned leather if the compounds are used in solution in organic solvents instead of in aqueous dispersions.

The treated leather has an excellent water-repellent effect and particularly does not permit water penetration while remaining soft and supple and uninfluenced in its drying and finishing properties. The leather has a particularly low water absorption under static as well as dynamic conditions and the leather is not hardened and retains a light color even under strong light. The method of the invention is particularly useful in the manufacture of modern, non-fatted waterproof leather. Finished leather for uppers of shoes and sole leather may be impregnated with the compositions of the invention.

The leather may be treated by any of the usual techniques such as brushing, immersion, spraying or surface application machines. The compositions of the invention should be used in sufficient amounts so that there is 2 to 25%, preferably 5 to 10%, of the impregnating agent based on the weight of the leather to be treated present in the treatment. After the composition has been applied to the leather, the leather is slowly dried in air or in a drying device at slightly elevated temperatures.

For application of the waterproofing agent by the spray method, solvent mixtures with high boiling points, such as heavy fractions of gasoline, toluene or xylene are suitable. By addition of small amounts of mineral oils it is possible to apply the impregnating agents so they will not adhere excessively to the surface of the leather being sprayed, but rather penetrate into the leather. Low boiling point solvents are unsuitable for spraying because they evaporate too rapidly during spraying and the impregnating agents are deposited primarily on the surface of the leather. If the immersion method is used, the distribution of the impregnating agent in the leather may also be controlled by changing the high boiling point solvents.

The impregnation effect, especially the water-repellent effect of the leather surface, may be further improved if silicone oils and/or hard waxes are added to the compositions of the invention. The term "silicone oils" is intended to include primarily the known bi- and tri-functional methylsiloxanes with reactive hydrogen atoms, as well as other polymerizates of organo-silicon compounds which are characterized by a —Si—O—Si— group or also by other bonds, such as —Si—CH$_2$—Si— or —Si—C$_6$H$_4$—Si—

In the silicones the silicon atoms may be substituted with organic radicals, such as alkyl, aryl, aralkyl, alkylaryl or alkoxy groups. Of particular interest are those organo-silicon polymers which contain not only organic radicals, such as methyl, but also hydrogen atoms. These products are commercially available in the form of solutions in organic solvents, such as methylene chloride, which, in addition, usually contain catalysts, such as tetrabutyl esters of titanic acid. Suitable hard waxes are natural or synthetic wax products, such as paraffin wax, Carnauba wax and particularly Montan wax, or ester waxes and carbonamide waxes of a synthetic nature. The various components may readily be dissolved in the compositions. The additives increase the waterproofing effect, so that smaller quantities of the compositions of the invention may be used if these additives are employed simultaneously.

In the following examples there are described several preferred embodiments to illustrate the invention. However, it should be understood that the invention is not intended to be limited to the specific embodiments.

Example I

A chrome-leather, tanned and fat-liquored in the customary manner, was immersed for 10 minutes in a 10% solution of mono-(2-octyldodecyl-1)-citric acid ester in a solvent consisting of 2 parts of isopropanol and 7 parts of benzine (boiling point=110 to 140° C.). Then, the leather was dried in air overnight and for one hour at 80° C. The examination of the samples was carried out on the Maeser-machine, and the number of bends up to water penetration was determined. The results are shown in Table I.

TABLE I

| | Water penetration after— |
|---|---|
| Untreated leather | 180 bends. |
| Mono-(2-octyldodecyl-1)-citric acid ester (obtained by Guerbet reaction). | 28,000 bends. |

Example II

A sample of chrome-tanned boxcalf leather was sprayed three times with a 10% solution of mono-(2-hexyl decyl-1)-citric acid ester in a solvent consisting of 2 parts of isopropanol and 7 parts of benzine (boiling point=160 to 200° C.). After being dried overnight in air and then dried at 80° C. for a short period, the leather was examined in the Maeser-machine. The results are shown in Table II.

TABLE II

| | Water penetration after— |
|---|---|
| Untreated leather | 95 bends. |
| Mono-(2-hexyldecyl-1)-citric acid ester (obtained by Guerbet reaction). | 45,000 bends. |

Example III

A sample of bottom leather tanned with vegetable synthetics, was immersed for 10 minutes in a 10% solution of mono-(2-octyldodecyl-1)-citric acid ester in a solvent consisting of 2 parts of isopropanol and 7 parts of benzine (boiling point=110 to 140° C.). Then, the leather was dired in air, and after climatization at 20° C. and 65% atmospheric moisture, the dynamic waterproofness was determined on the Bally-permeometer. The results are shown in Table III.

TABLE III

| | Water penetration after— | Percent Water absorbability after 1 hour | Water permeability after 1 hour |
|---|---|---|---|
| Untreated leather | 4 minutes | 53 | 2.5 |
| Mono-(2-octyldodecyl-1)-citric acid ester (obtained by Guerbet reaction). | 280 minutes | 27 | 0.0 |

Various modifications of the method and compositions of the invention may be made without departing from the spirit or scope thereof and it is to be understood that the invention is to be limited only as defined in the appended claims.

Example IV

Samples of a chrome-tanned, fat-liquored and customarily finished caft leather were immersed for 5 minutes into the solution described as below, and were then dried in the air.

Parts of a condensation product of aluminium isopropylate and an acid dodecylphosphoric acid ester mixture _____ 2.0
Parts Montan wax _____ 1.0
Parts silicone oil _____ 2.0
Parts mono-(2-octyldodecyl-1)-citric acid ester __ 1.25
Parts trichloroethylene _____ 93.75

100.0

The leather was tested for its water-repellent properties in the Maeser machine, and furnished the following values:

|  | Water penetration after— | Water absorption after 10,000 bends, percent | Water absorption, percent (Kubelka) after— | | |
|---|---|---|---|---|---|
|  |  |  | 30 min. | 2 hrs. | 24 hrs. |
| Control | 390 bends | 90 | 46 | 59 | 65 |
| Impregnated | 100,000 bends | 13 | 12 | 21 | 46 |

Example V

Samples of combination chrome-tanned, waterproof leather (thickness 1.7 mm.) finished with plastic coating dyes, having an extractable fat content of not more than 8 to 10%, was immersed for 10 minutes into the solution as described in Example IV. In comparison to normal, unimpregnated leather, the following water-resistance values were obtained after drying:

|  | Water penetration after— | Water absorption after 10,000 bends, percent | Water permeability after 10,000 bends, gm. |
|---|---|---|---|
| Control | 270 bends | 42 | 29 |
| Impregnated | 62,000 bends | 1.5 | 0 |

Example VI

Samples of dry sole leather were immersed for 15 minutes in the solution described in Example IV and were then slowly dried and rolled. The testing of the finished sole leather samples were accomplished by the Baumann method with the aid of the Bally permeometer. The control normal sole leather was penetrated by water after 15 minutes, whereas water did not penetrate the immersed sole leather until after 4 hours.

We claim:
1. Leather or fur impregnated with a water-proofing agent consisting essentially of at least one citric acid derivative selected from the groups consisting of partial esters and partial amides thereof having at least one free carboxyl group and having in the ester and amide moiety at least one saturated branched aliphatic hydrocarbon radical of 10 to 20 carbon atoms wherein 30 to 70% of the carbon atoms are in the side chains wherein the amount of said citric acid derivative is 2 to 25% by weight of the leather or furs.

2. A composition for rendering leather or furs waterproof consisting essentially of a solution of 1 to 25% by weight of at least one citric acid derivative selected from the group consisting of partial esters and partial amides thereof having at least one free carboxyl group and having in the ester and amide moiety at least one saturated branched aliphatic hydrocarbon radical of 12 to 20 carbon atoms wherein 30 to 70% of the carbon atoms are in the side chain in organic solvents.

3. The composition of claim 2 wherein the citric acid derivative is a mono ester of citric acid and a branched alphatic alcohol of 12 to 20 carbon atoms, 30 to 70% of which are in side chains.

4. The composition of claim 2 wherein the said solution also contains 0.5 to 5% of a cationic-active, complex salt of a polyvalent metal alcoholate and an acid ester of a phosphoric acid.

5. The composition of claim 2 wherein the citric acid derivative is mono-(2-octyldodecyl-1)-citric acid ester.

6. The composition of claim 2 wherein the citric acid derivative is mono-(2-hexyldecyl-1)-citric acid ester.

References Cited

UNITED STATES PATENTS

| 2,115,509 | 4/1938 | Jaeger | 8—94.22 X |
| 2,629,701 | 2/1953 | Ericks | 117—154 X |
| 3,010,780 | 11/1961 | Plapper et al. | 117—135.5 X |
| 3,106,478 | 10/1963 | Heyden et al. | 117—135.5 X |

WILLIAM D. MARTIN, Primary Examiner

H. J. GWINNELL, Assistant Examiner

U.S. Cl. X.R.

117—141, 142